Patented Oct. 3, 1939

2,174,737

UNITED STATES PATENT OFFICE 2,174,737

PREPARATION OF 1,1,2-TRICHLOROETHANE

Gerald H. Coleman and Garnett V. Moore, Midland, Mich., assignors to The Dow Chemical Company, Midland, Mich., a corporation of Michigan No Drawing. Application February 24, 1936, Serial No. 65,418

9 Claims. (Cl. 260—658)

This invention relates to processes for the production of 1,1,2-trichloroethane and, more particularly, to a continuous process for making said compound by the direct chlorination of ethylene chloride in the liquid phase.

It is an object of the present invention to provide a process for the production of 1,1,2-trichloroethane from ethylene chloride whereby high yields of the desired product can be obtained in a simple and economical manner. A further object of the invention is to provide a process for the direct chlorination of ethylene chloride whereby the formation of products such as tetrachloroethane and higher polychlorinated ethanes, which ordinarily predominate in the product obtained from the direct chlorination of ethylene chloride, is materially minimized.

In our method for producing 1,1,2-trichloroethane from ethylene chloride, we employ a liquid reaction bath containing ethylene chloride and 1,1,2-trichloroethane, which is to be maintained at a temperature above about 50° C. Gaseous chlorine, preferably oxygen-free, and liquid ethylene chloride are passed continuously into the bath in the ratio of between about 0.2 and about 1.0 mol of chlorine to each mol of ethylene chloride. Preferably this ratio of chlorine to ethylene chloride is between about 0.25 and about 0.5. The reaction is to be carried out in the presence of actinic light, which may be derived from any suitable source, such as a mercury-vapor lamp or a sun lamp. The 1,1,2-trichloroethane produced can readily be separated from the reaction product by fractional distillation.

In our continuous process for making 1,1,2-trichloroethane, ethylene chloride and chlorine in the range of proportions above given are continuously fed into a reaction bath, and a portion of the bath continuously withdrawn. The portion so withdrawn is treated with alkali to neutralize any hydrogen chloride therein, and fractionally distilled. The first fraction recovered, which is substantially unreacted ethylene chloride, is re-cycled in the process, and the desired product, 1,1,2-trichloroethane, is then separated from the small amount of higher polychlorinated ethanes, which remain as a still residue. The hydrogen chloride gas produced in the reaction is continuously vented from the reaction bath and is preferably scrubbed with the make-up ethylene chloride entering the process, to remove any chlorine therein entrained.

The following example is illustrative of the practice of our invention:

Over a period of approximately five weeks 29,440 pounds of ethylene chloride was reacted in the above-described bath, by passing it thereinto at a substantially uniform rate varying between 150 and 170 pounds per hour. During this time 16,900 pounds of oxygen-free chlorine was passed into the reaction bath at a substantially uniform rate varying between 25 and 30 pounds per hour. The temperature of the bath was maintained at about 65°–70° C. during reaction of the materials. Light from twenty-one 400-watt mercury-vapor lamps, distributed uniformly through the interior of the reactor in glass-inclosed chambers wherethrough air could be blown to carry away the heat given off by the lamps, was used to catalyze the reaction.

A portion of the liquid reaction bath was continuously withdrawn from the reactor. The rates of flow of reactants were controlled so that this overflow portion had a specific gravity of about 1.30 at 20° C., corresponding to a content of about 22 per cent trichloroethane, 75 per cent unreacted ethylene chloride, and 3 per cent higher polychlorinated ethanes. This product was admixed with a 5 per cent aqueous solution of sodium carbonate to neutralize any hydrogen chloride present, then layered-off and passed through a calcium chloride dryer to a still where the unreacted ethylene chloride, the desired 1,1,2-trichloroethane, and the higher chlorinated ethanes were separated from each other by fractional distillation. The recovered ethylene chloride was then returned to the reactor.

The exit gases from the reactor passed through a condenser to liquefy most of the ethylene chloride present therein. The condensate, and the remaining gases, then entered the bottom of a scrubber tower, down through which was flowing make-up ethylene chloride on its way to the reactor. The condensed ethylene chloride joined the ethylene chloride feed, and the remaining gases, passing upward through the tower, were scrubbed free of chlorine. The hydrogen chloride comprising most of the remaining gases was then absorbed in a water scrubber.

In the above manner we obtained 24,720 pounds of 1,1,2-trichloroethane, which represents a yield slightly above 62 per cent of theoretical. The average composition of the higher polychloroethanes was 18.9 per cent 1,1,1,2-tetrachloroethane, 33.2 per cent 1,1,2,2-tetrachloroethane, 40.1 per cent pentachloroethane, and 7.8 per cent residue.

The yield obtained in the foregoing example represents the results in an experimental semi-plant wherein practical difficulties were encountered and conditions for the reaction were not optimum. We have operated the process in the laboratory under close control, to obtain yields of 1,1,2-trichloroethane as high as 90 per cent, based on the ethylene chloride reacted, the percentage of higher polychloroethanes formed being very small, i. e., less than 10 per cent.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. The method of preparing 1,1,2-trichloroethane which comprises simultaneously passing ethylene chloride and gaseous chlorine, in the ratio of between about 0.2 and about 1.0 mol of chlorine per mol of ethylene chloride, into a liquid reaction bath containing above 50 per cent by weight of ethylene chloride, and 1,1,2-trichloroethane, while maintaining said bath at a temperature above 50° C., in the presence of actinic light.

2. The method of preparing 1,1,2-trichloroethane which comprises simultaneously passing ethylene chloride and gaseous chlorine, in the ratio of between about 0.2 and about 1.0 mol of chlorine per mol of ethylene chloride, into a liquid reaction bath containing above 50 per cent by weight of ethylene chloride, and 1,1,2-trichloroethane, while maintaining said bath at a temperature between about 60° and about 80° C., in the presence of actinic light.

3. The method of preparing 1,1,2-trichloroethane which comprises simultaneously passing ethylene chloride and gaseous chlorine, in the ratio of between about 0.25 and about 0.5 mol of chlorine per mol of ethylene chloride, into a liquid reaction bath containing above 60 per cent by weight of ethylene chloride, and 1,1,2-trichloroethane, while maintaining said bath at a temperature above 50° C., in the presence of actinic light.

4. The method of preparing 1,1,2-trichloroethane which comprises simultaneously passing ethylene chloride and substantially oxygen-free gaseous chlorine, in the ratio of between about 0.2 and about 1.0 mol of chlorine per mol of ethynene chloride, into a liquid reaction bath containing above 50 per cent by weight of ethylene chloride, and 1,1,2-trichlorethane, while maintaining said bath at a temperature above 50° C. in the presence of actinic light.

5. The method which comprises simultaneously passing ethylene chloride and gaseous chlorine, in the ratio of between about 0.2 and about 1.0 mol of chlorine per mol of ethylene chloride, into a liquid reaction bath containing above 50 per cent by weight of ethylene chloride, and about 20 per cent by weight of 1,1,2-trichloroethane, while maintaining said bath at a temperature above 50° C. in the presence of actinic light.

6. In a continuous method of preparing 1,1,2-trichloroethane, the steps which consist in simultaneously passing ethylene chloride and gaseous chlorine, in the ratio of between about 0.2 and about 1.0 mol of chlorine per mol of ethylene chloride, into a liquid reaction bath containing above 50 per cent by weight of ethylene chloride, and 1,1,2-trichloroethane, while maintaining said bath at a temperature above 50° C. in the presence of actinic light, continuously withdrawing a portion of said bath, separating ethylene chloride and 1,1,2-trichloroethane from said portion and returning such ethylene chloride to the reaction bath.

7. In a continuous method of preparing 1,1,2-trichloroethane, the steps which consist in simultaneously passing ethylene chloride and gaseous chlorine, in the ratio of between about 0.2 and about 1.0 mol of chlorine per mol of ethylene chloride, into a liquid reaction bath containing above 50 per cent by weight of ethylene chloride, and 1,1,2-trichloroethane, while maintaining said bath at a temperature between about 60° and about 80° C. in the presence of actinic light, continuously withdrawing a portion of said bath, separating ethylene chloride and 1,1,2-trichloroethane from said portion and returning such ethylene chloride to the reaction bath.

8. In a continuous method of preparing 1,1,2-trichloroethane, the steps which consist in simultaneously passing ethylene chloride and gaseous chlorine, in the ratio of between about 0.25 and about 0.5 mol of chlorine per mol of ethylene chloride, into a liquid reaction bath containing above 50 per cent by weight of ethylene chloride, and 1,1,2-trichloroethane, while maintaining said bath at a temperature between about 60° and about 80° C. in the presence of actinic light, continuously withdrawing a portion of said bath, separating ethylene chloride and 1,1,2-trichloroethane from said portion and returning such ethylene chloride to the reaction bath.

9. A method of producing 1,1,2-trichloroethane, which comprises treating 1,2-dichloroethane in the presence of actinic radiations, with an amount of chlorine slightly smaller than that theoretically necessary for transforming the whole of said 1,2-dichloroethane into 1,1,2-trichloroethane.

GERALD H. COLEMAN.
GARNETT V. MOORE.